June 15, 1971 W. STURM 3,584,387

SLOPE INDICATING DEVICE

Filed Feb. 6, 1969 2 Sheets-Sheet 1

INVENTOR
WALTER STURM
By
Baldwin, Egan, Walling & Fetzer
ATTORNEYS

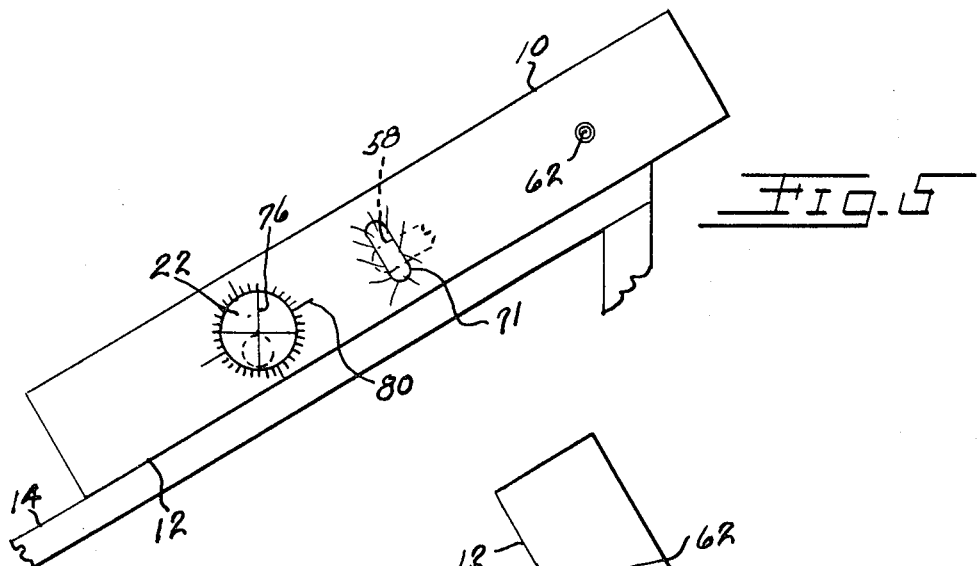
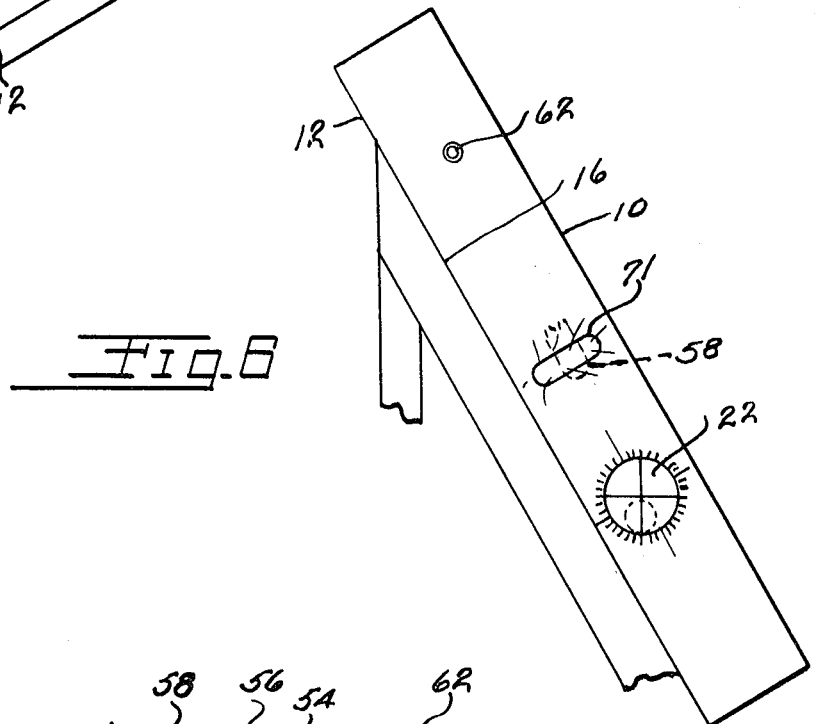
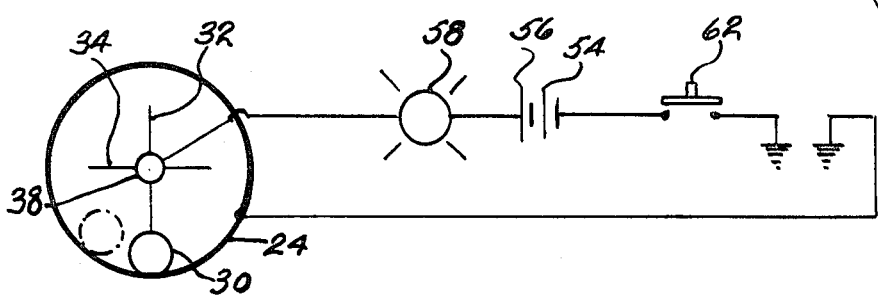

United States Patent Office 3,584,387
Patented June 15, 1971

3,584,387
SLOPE INDICATING DEVICE
Walter Sturm, R.R. 1, Duntroom, Ontario, Canada
Filed Feb. 6, 1969, Ser. No. 797,118
Int. Cl. G01c 9/10
U.S. Cl. 33—206                                5 Claims

ABSTRACT OF THE DISCLOSURE

A slope indicating device in the form of a carpenter's level having a metal sphere operatively disposed in an annular chamber formed in a cylindrical shaped barrel disposed in the level. Prepositioned contacts are disposed on the inner wall of the annular chamber such that the sphere contacts certain of said contacts to close an electrical circuit and actuate an electric signal device when the level is disposed at preselected angles. The barrel is angularly adjustable and contains indicating means on its outer surface in coaction with a degree angle scale on the adjacent surface of the level to enable an operator to angularly position the barrel (and chamber) at a preselected angle after which the level itself may be positioned at such angle as will be indicated by actuation of the electric signal device.

---

This invention relates to slope indicating devices and more particularly to a carpenter's level having electrical indicating means that is automatically actuated when the level is disposed at preselected angle.

In prior carpenter's levels of the type adapted to indicate slope or angle of inclination, difficulty has been experienced in determining when the level is disposed at exactly the angle selected or to be measured.

Accordingly, it is an object of the present invention to provide a carpenter's level of the slope indicating type having electrical indicating means for signalling when the level is disposed at precisely the angle selected.

A further object of the invention is to provide a slope indicating device of the above type that is simple in construction, inexpensive to manufacture, and highly effective in operation.

Briefly, the foregoing objects are accomplished by the provision of a carpenter's level type slope indicating device including an elongated casing having a straight longitudinal surface adapted to be applied against a slope. The casing contains an angularly adjustable cylindrical barrel having an annular interior chamber therein. An electrically conductive, gravity-oriented, free-moving contact element such as a metal sphere is operatively disposed in the chamber and which seeks by gravity a predetermined lower position in the chamber as the casing (i.e. the chamber) is angularly displaced from the horizontal. An electrically operated signal device (and coacting electrical circuit) is disposed in the casing. Prepositioned contacts are disposed on the inner wall of the chamber flush therewith such that the sphere contacts certain of said contacts to close the electrical circuit and actuate the signal device (i.e. lamp, buzzer, etc.) when the level is disposed at preselected angles. The barrel is angularly adjustable and contains an indicating means on its outer surface in coaction with a degree scale on the adjacent surface of the level to enable an operator to angularly position the barrel (and chamber) at a preselected angle, after which the level itself may be positioned at such angle as will be indicated by actuation of the electrical signal device.

Thus, there is provided an inexpensive, highly effective slope indicating device of the carpenter's level type having electrical indicating means for signalling when the level is disposed at precisely the angle selected or to be measured.

Other objects and advantages of the invention will be apparent from the following description taken in conjunction with the drawings wherein:

FIG. 5 is a front elevational view of the device shown in FIG. 1 applied in operative position on an angled surface;

FIG. 6 is a view similar to FIG. 5, but showing the device operatively applied to anothed angled surface; and FIG 7 is a schematic wiring diagram of the electrical circuit contained in the device shown in FIG. 1.

Figure 1:
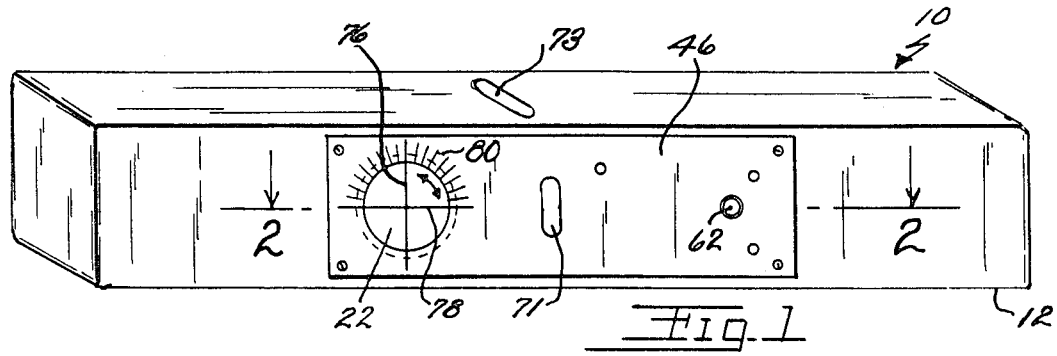
FIG. 1 is a front perspective view of a slope indicating device constructed in accordance with the invention.
Figure 2:
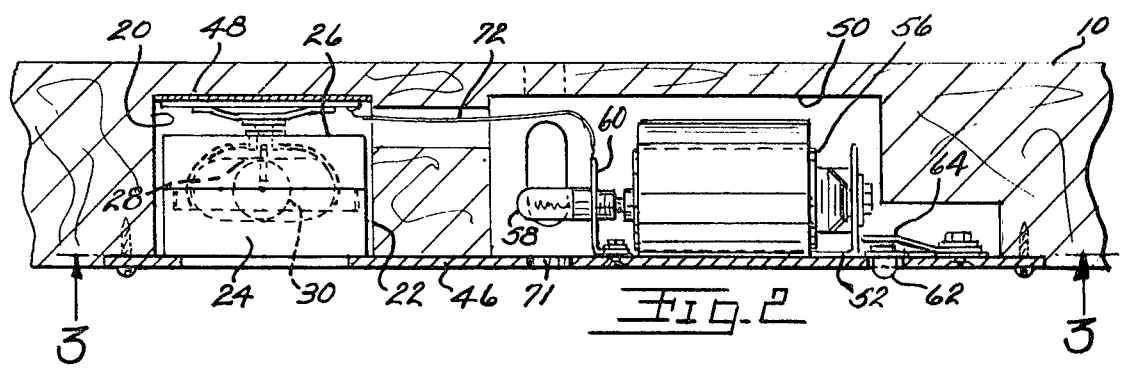
FIG. 2 is an enlarged view taken along the line 2—2 of FIG. 1.
Figure 3:
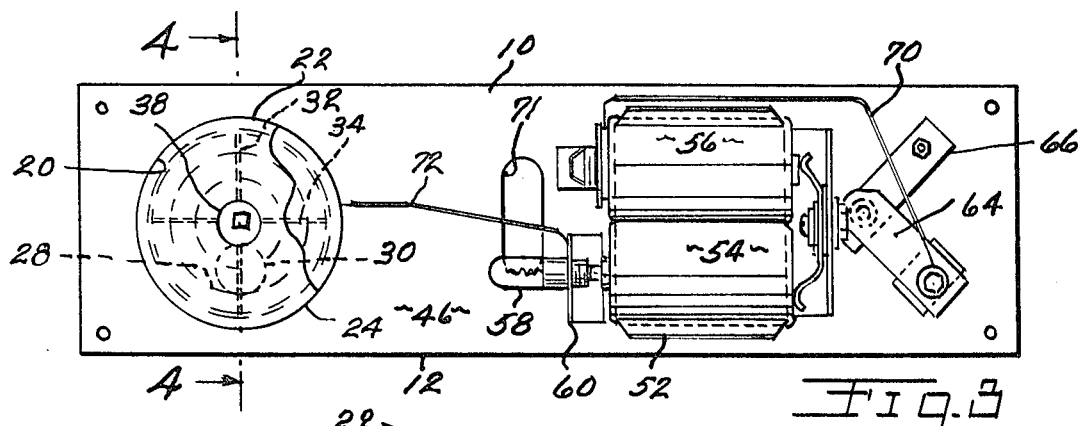
FIG. 3 is a view taken along the line 3—3 of FIG. 2.

Although the invention is shown and described herein with reference to carpenter's levels, it will be understood that it may be applied to any type of slope indicating device.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

Referring to the drawings, there is shown a slope indicating device of the carpenter's level type constructed in accordance with the invention and including an elongated rectangular casing 10 having a straight longitudinal surface 12 adapted to be applied against a slope 14 (FIG. 5) or slope 16 (FIG. 6), for example, to determine the angle of slope thereof.

Figure 4:
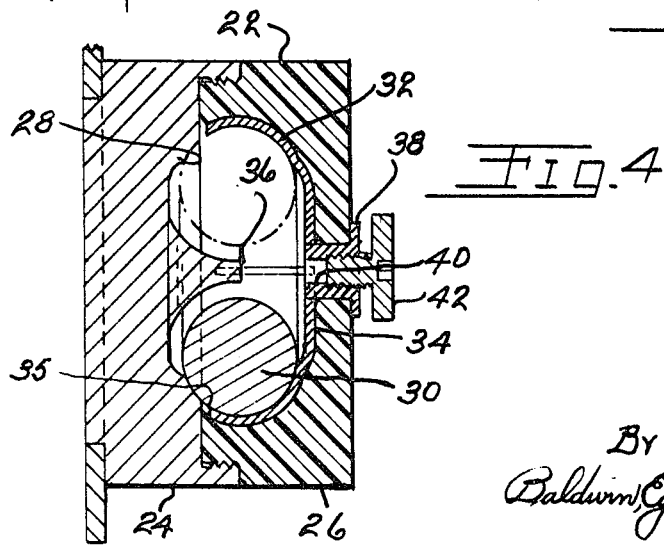
FIG. 4 is a view taken along the line 4—4 of FIG. 3.

The casing 10 has a hollow 20 containing a cylindrical-shaped barrel 22 formed of two coacting matched shells 24 and 26 threaded or otherwise joined together as best shown in FIG. 4. The barrel 22 contains an annular chamber 28 (elliptical in transverse configuration) in which is operatively disposed an electrically-conductive gravity-oriented, free-moving contact element or metal sphere 30. The shell 24 is formed of electrically conducting material such as metal, and the shell 26 is formed of a non-conducting material such as a synthetic organic plastic. Contact points in the form of two wires 32 and 34 crossing each other at 90 degrees angles to form 90 degree quadrant contacts are selectively embedded in the inner surface 35 of the shell 26 flush therewith. A center post 36 is disposed centrally in the chamber 28 to prevent the ball from traveling directly across the chamber. The wires 32 and 34 are connected to a collet 38 having a bore 40 in which is threaded a bolt 42, the purpose of which will be hereinafter explained.

The barrel 22 is retained in position in the casing hollow 20 by a front facing plate 46 secured to the casing 10, such barrel abutting against a back plate 48, the function of which will be later described.

The casing 10 also has a hollow 50 containing an electircally operated signal means and its coacting electrical circuit, now to be described. Secured to the front plate 46 is a battery frame 52 containing batteries 54 and 56 connected in series in conventional manner. A lamp 58 is secured in a lamp bracket 60 so that the base of the lamp operatively contacts the battery 54. A conventional pushbutton 62 and associated contact arms 64 and 66 are mounted on the face plate 46.

Slot windows 71 and 73 are provided in the face plate 46 and in the casing 10, respectively, to enable an operator to view the lamp 58.

An electrical circuit is provided for the signal means including the wire 70 connecting the pushbutton contact arm 64 with the negative side of the battery 56, and the wire 72 connecting the back plate 48 with the lamp bracket 60, such circuit being shown schematically in FIG. 7.

The front surface of the barrel 22 has suitable indicia formed thereon in the form of the crossed lines 76, 78 which selectively coact with a degree scale 80 on the adjacent face plate 46. The lines 76 and 78 are in line with and register with the wires 32 and 34, respectively, with the level horizontal.

In operation, the level is placed on a slope in the manner shown in FIGS. 5 and 6. Next the pushbutton 62 is pressed, after which the barrel 22 is angularly rotated in the casing 10 until the lamp 58 goes on. The angle of inclination is then read via the line 78 on the scale 80.

If the level is to be set at a preselected angle, the barrel 22 is rotated until such angle is registered by the barrel line 78 on the scale 80, after which the level is tilted until the lamp 58 is lit indicating that the level is disposed at such preselected angle.

Thus the invention provides a highly efficient slope indicating device for determining the angle of a slope including an elongated casing 10 having a straight longitudinal surface 12 adapted to be applied against the slope, such casing 10 having a preconfigured annular interior chamber 28 therein. An electrical conductive gravity oriented free-moving contact element such as, for example, the sphere 30 is operatively disposed in the chamber 28 and which seeks by gravity a predetermined lower position in the chamber as the surface 12 of the casing 10 is angularly displayed from the horizontal. An electrically operated signal means 58 is disposed in the device along with an electrical circuit for operating the signal means 58, such circuit having coacting contact points 32, 34 disposed in the chamber 28 and contactable with the contact element or sphere 30 when it is disposed in its lower position so that the circuit is completed and the signal means 58 is thereby operated. Adjusting means in the form of the angularly rotatable barrel 22 is provided and is operative to angularly displace said contact points 32 and 34 with respect to the surface 12 of the casing 10 thereby varying the inclination of the casing at which one of said contact points simultaneously engages the contact element 30. Also, provided are indicating means in the form of the degree or quadrant scale 80 coacting with said adjusting means 22 and operative to indicate the inclination of said surface 12 of the casing at which one of said contact points 32, 34 will simultaneously engage the contact element 30 and cause operation of said signal means 58.

The contact element 30 may be any type of suitable gravity-seeking object such as a sphere, an elongated cylindrical body, etc. Likewise, the indicating means 58 may be a lamp, buzzer, bell, etc.

It is to be noted that the chamber 28 is annular and is substantially elliptical in transverse configuration whereby the chamber's equatorial plane is disposed in the longitudinal plane of the level. The chamber 28 may contain a nonconductive liquid to retard the action of the sphere 30 and reduce oscillation thereof.

The sphere 30 completes the connection of the electrical circuit by connecting one of the wires 32, 34 (FIG. 7) with the metal shell 24 which is connected (or touches) the facing plate 46 which functions as an electrical ground to complete the circuit. The wires 32, 34 are connected to the collet 38 which threadedly retains and contacts the bolt 42, which in turn contacts the back plate 48, such plate being connected to the lamp bracket 60 by the wire 72.

What is claimed is:

1. A slope indicating device for determining the angle of a slope comprising, an elongated casing having a straight longitudinal surface adapted to be applied against the slope, said casing having a preconfigured annular interior chamber therein, an electrical conductive gravity oriented free-moving metal sphere operatively disposed in said chamber and which seeks by gravity a predetermined lower position in the chamber as said surface of the casing is angularly displayed from the horizontal, an electrically operated signal means disposed in the device, an electrical circuit disposed in the device for operating said signal means and having coacting contact points disposed in said chamber and contacting the metal sphere when it is disposed in said lower position so that said circuit is completed and said signal means is thereby operated, adjusting means operative to angularly displace said contact points with respect to said surface of the casing thereby varying the inclination of the casing at which said contact points simultaneously engage the metal sphere, and indicating means coacting with said adjusting means and operative to indicate the inclination of said surface of the casing at which said contact points will simultaneously engage the metal sphere and cause operation of said signal means, said interior chamber has its equatorial plane disposed in a longitudinal plane of the device, said chamber being substantially elliptical in transverse configuration, and a center post disposed centrally in the chamber to prevent the contact element from traveling directly across the chamber, said adjusting means is formed by a cylindrical shaped barrel in the form of two coacting matched shells joined together, one shell being formed of electrical conducting material, the other shell being formed of non-conducting material, certain of said contact points being formed by wires selectively imbedded in the inner surface of the other shell, another contact point being the one shell, said contact being electrically connected to the signal device whereby the contact element completes the connection between the contact point in one shell and one of the contact points in the other shell to actuate the signal device, said certain contact points are formed by two wires crossing each other at 90° angles to form 90° quadrant contacts for the contact element to selectively contact, said two wires being embedded in the shell inner surface flush therewith.

2. The structure of claim 1 wherein said signal device is a battery-operated lamp.

3. The structure of claim 1 wherein said signal device is a battery-operated buzzer.

4. The structure of claim 1 wherein said electrical circuit includes a pushbutton for selectively completing the circuit to the signal means whereby the signal means may be activated only when the slope indicating device is substantially in preselected position for a reading of the indicating means.

5. The structure of claim 1 wherein said indicating means includes a quadrant scale disposed exteriorly on the device adjacent the adjusting means, said adjusting means having indicia thereon for selectively registering with the quadrant scale to indicate the angle of inclination of the slope indicating device.

References Cited

UNITED STATES PATENTS

| 1,626,567 | 4/1927 | Steinbrecht | 33—206(.5L) |
| 2,511,525 | 6/1950 | Bradwell | 33—206(.5) |
| 2,527,961 | 10/1950 | Rantz | 33—213 |
| 2,600,363 | 6/1952 | Morris | 33—206(.5) |
| 3,204,233 | 8/1965 | Olliff | 33—206(.5) |

FOREIGN PATENTS

| 726,809 | 1942 | Germany | 33—206(.5) |

LEONARD FORMAN, Primary Examiner

D. A. DEARING, Assistant Examiner